July 27, 1965   C. E. PALMER ETAL   3,196,759
METHOD OF FOLDING PLASTIC CONTAINERS
Filed Nov. 8, 1963   3 Sheets-Sheet 1
FIG. 1
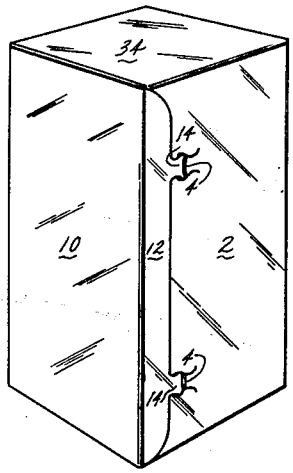
FIG. 6
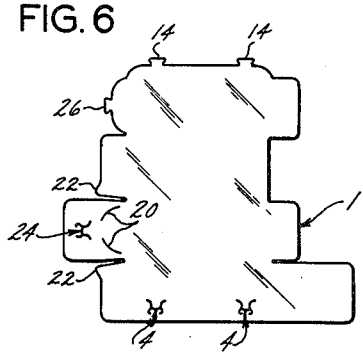
FIG. 2
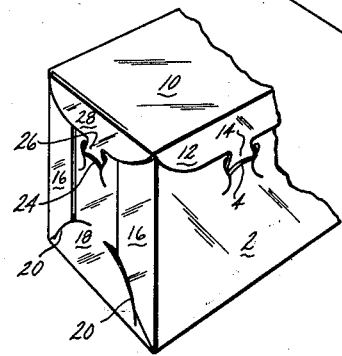
FIG. 3
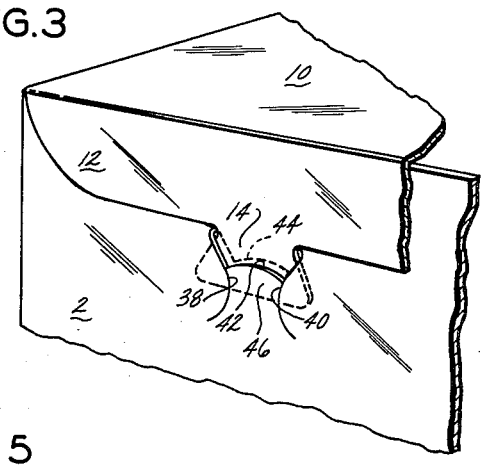
FIG. 4
FIG. 5
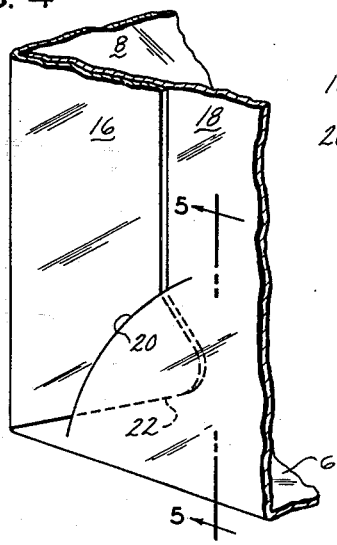
FIG. 7
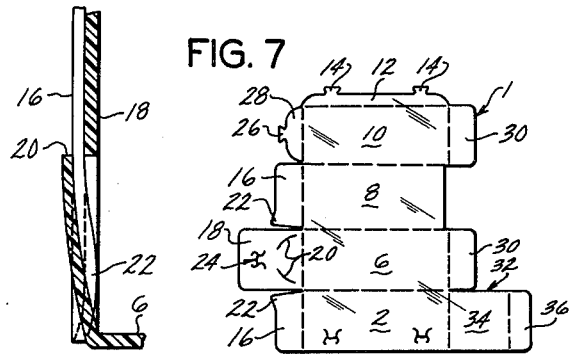
*INVENTORS*
CHARLES E. PALMER
JOSEPH S. LEMANSKI
BY
*Peter L. Costas*
ATTORNEY

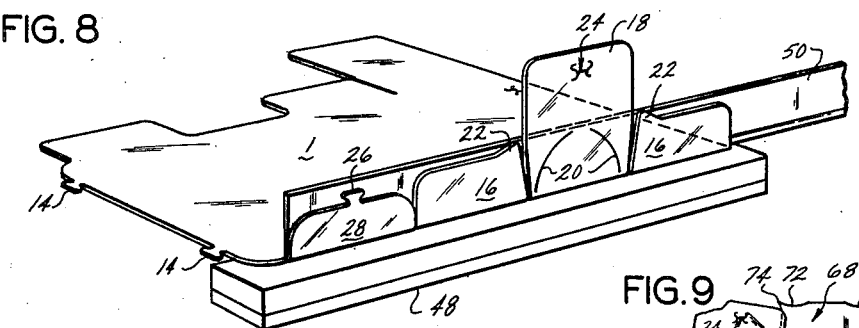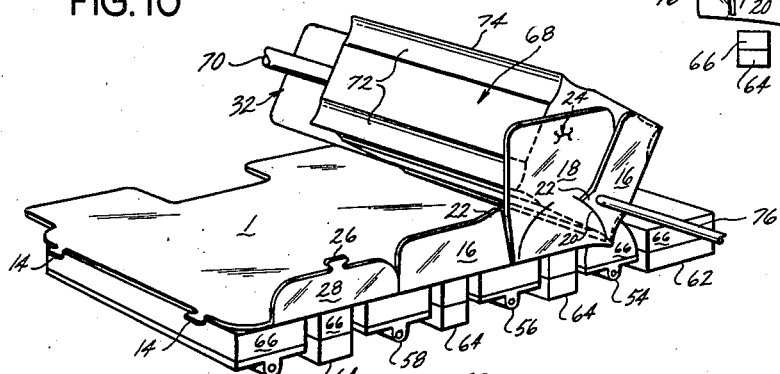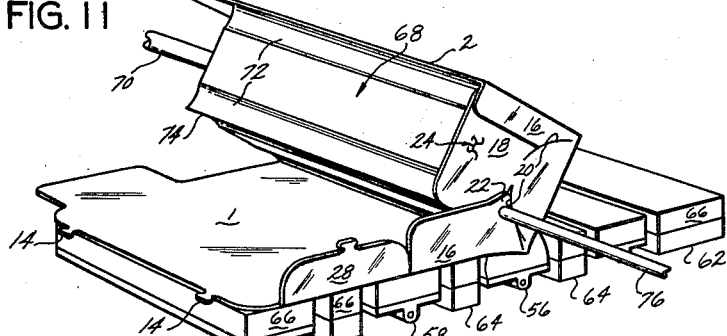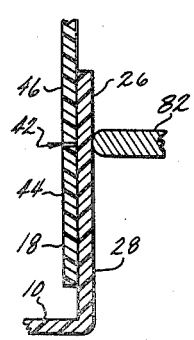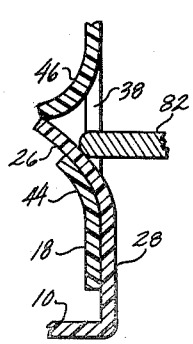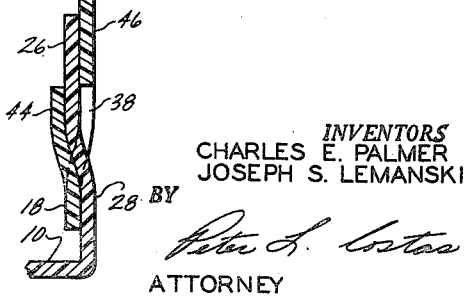

July 27, 1965 C. E. PALMER ETAL 3,196,759
METHOD OF FOLDING PLASTIC CONTAINERS
Filed Nov. 8, 1963 3 Sheets-Sheet 3

INVENTORS
CHARLES E. PALMER
JOSEPH S. LEMANSKI
BY

ATTORNEY

United States Patent Office 3,196,759
Patented July 27, 1965

3,196,759
METHOD OF FOLDING PLASTIC CONTAINERS
Charles E. Palmer, Turnpike Road, Somers, Conn., and Joseph S. Lemanski, Longmeadow, Mass.; said Lemanski assignor to said Palmer
Filed Nov. 8, 1963, Ser. No. 323,540
11 Claims. (Cl. 93—36)

This application is a continuation-in-part of our copending application Serial Number 210,639, filed July 18, 1962, Method of Folding Plastic Containers, now abandoned.

The present invention relates to containers, and more particularly to containers cold-folded from plastic sheet material and to the blanks therefore and the method of folding the blanks into the containers.

In United States Patent No. 2,954,725, granted to Charles E. Palmer, there is disclosed a novel method and apparatus for cold-folding synthetic plastic sheet material having the characteristics of semi-rigidity and ability to take and retain a fold such as biaxially oriented polystyrene. In cold-folding such plastic sheet material, it generally is necessary to fold the plastic sheet material beyond 90 degrees in order to obtain the desired permanent set of the fold, and it is also necessary to employ locks which will resist high stresses over a relatively wide linear distance to avoid concentration of stress at any one linear point such as would produce tearing of the plastic sheet material. It is desirable to design the carton and locks so that stresses will not produce delamination or crazing in highly oriented material so as to avoid discloration and marring of the surface.

It is an object of the present invention to provide a novel method for cold-folding blanks of synthetic plastic sheet material.

It is also an object to provide such a method which is operable at relatively high speeds and which is adapted to forming a six-sided container having a rugged lock for overlying panels.

Another object is to provide a high-speed folding method wherein the blank may be folded into condition to receive the intended contents in one complete revolution of a folding mandrel with the necessary locks and engagements being made during the rotation of the mandrel.

Other objects and advantages will be readily apparent from the following detailed specification and the attached drawings wherein:

FIGURE 1 is a perspective view of a container embodying the present invention;

FIGURE 2 is a fragmentary perspective view of the bottom end of the container of FIGURE 1;

FIGURE 3 is a fragmentary perspective view to an enlarged scale of a lock on the body portion;

FIGURE 4 is a fragmentary perspective view to an enlarged scale of a slip lock on the bottom end of the container;

FIGURE 5 is a sectional view along the line 5—5 of FIGURE 4;

FIGURE 6 is a plan view to a reduced scale of the blank for the container of FIGURE 1;

FIGURE 7 is a similar view of the blank of FIGURE 6 with the lines of intended fold indicated in dotted line;

FIGURE 8 is a perspective view showing diagrammatically the first step in folding the blank of FIGURE 6 into the container of FIGURE 1;

FIGURE 9 is a fragmentary end view showing the blank positioned for further folding by a folding mandrel;

FIGURE 10 is a perspective view showing diagrammatically the next step in the folding sequence;

FIGURE 11 is a similar view showing another step in the folding sequence;

FIGURES 14 through 16 are sectional views showing diagrammatically the engagement of the interlock of the present invention.

Figure 12:
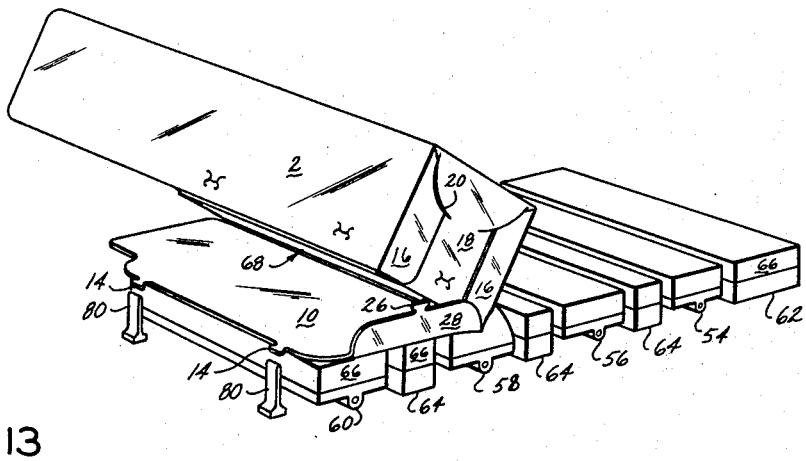
FIGURE 12 is a similar view showing a further step in the folding sequence.
Figure 13:
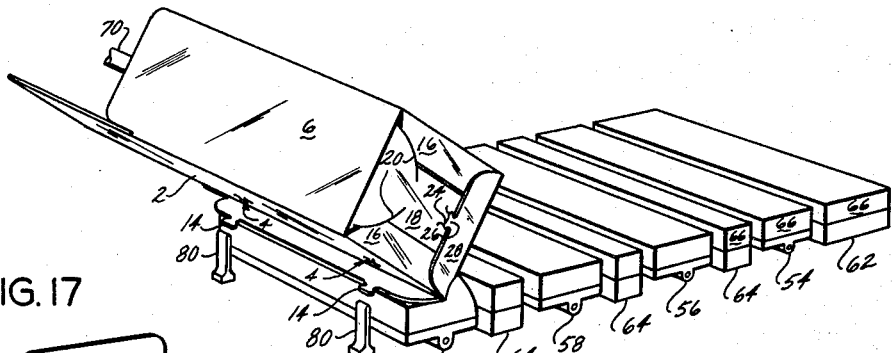
FIGURE 13 is a similar view showing the last fold being made in the body portion.

We have now found that the foregoing and related objects can be attained by a container integrally formed from a blank of synthetic plastic sheet material and having front, rear and side wall panels forming a rectangular body and a side flap on a side panel which overlies the rear panel and which is adapted to be engaged with the rear panel, preferably by a locking tab thereon engaged in a locking incision in the rear panel, although other means such as adhesives, heat-sealing or solvent sealing or external means may also be employed. Along the bottom edge of the wall panels are provided a bottom end wall flap, a pair of dust flaps, and a locking flap which extend perpendicularly thereto and are engaged to provide the bottom closure. The locking flap is located upon the edge of the one side wall panel and engages with the end wall flap which is located upon the other side wall panel, conveniently by a locking tab on one flap and a cooperating incision in the other flap. Along the top edge of the wall panels are provided a pair of dust flaps and an elongated flap which is folded to provide an end flap overlying the dust flaps and a tuck or locking flap extending perpendicularly thereto along the surface of the body of the container to provide a releasable closure for the container although a similar locking tab and incised end wall flap may be employed for a strong lock in place of the simple tuck flap if so desired.

In the method of folding the blank of the present invention into the container, a single mandrel is employed for forming the elongated folds defining the various wall panels of the body with a preliminary step being the formation of a transverse fold across the bottom end of the blank to fold and set up the bottom wall flaps. The blank with the end fold is then supported upon a series of pivotally mounted support members having their axes coinciding with the intended lines of fold and a top surface or pad of resiliently deformable material. The mandrel has its side faces dimensioned to correspond with the intended width of the wall panels and to align the edges with the intended lines of fold. The sides of the mandrel adjacent the edges are undercut to provide knife edges along the sides. The mandrel is supported for rolling movement laterally over the several support members so as to depress the plastic material of the blank into the resiliently deformable material of the pads, which deformation also forces the plastic material about the undercut side edges of the mandrel to effect the desired fold therein. As the mandrel rolls along the blank from pad member to pad member, the dust flaps and locking flaps are engaged with the bottom end wall flap; and, where a locking tab is employed, as the mandrel makes the final fold for the side flap along the side of the last panel, the locking tab thereon is engaged in the incision of the adjacent wall panel.

Thus, the blank is readily and speedily folded into the container form ready to receive the contents. The folds in the top end flaps are conveniently effected by a simple folding blade which is inserted into position with its edges aligned with the intended folds in the dust flaps and top flap, and die pads of resiliently deformable material are moved against the blank and folding blade so as to cause the resiliently deformable material to flow about the blank and folding blade and force the plastic material about the edges of the blade and form the fold therein. The fold defining the tuck flap can be made either before or after the other folds either by moving a folding blade towards a supporting pad of resiliently deformable material or vice versa.

The lock of the present invention is formed by providing a complex curvilinear incision in the underlying panel which includes a pair of opposed and aligned generally S-shaped slits having opposed arcuate portions pointing towards each other at the ends of the slits spaced away from the free end of the panel and reversely curved arcuate portions with terminal portions extending towards each other at the end thereof adjacent the free end of the panel. A transverse arcuate slit pointing towards the free end of the panel intersects the S-shaped slits at the opposed arcuate portions at a point spaced from the point of their closest proximity towards the free end of the panel and provides a pair of hinged flaps between the S-shaped slits. The overlying locking flap is provided on its outer edge with a projecting locking tab of generally dovetailed configuration having a free end of greater width than the root portion thereof and of greater width than the spacing between the S-shaped slits at the point of closest proximity between the opposed arcuate portions and at the point of greatest separation between the reversely curved portions. The width of the tab tapers to a reduced dimension at the root whereat it is of lesser dimension than the spacing between the reversely curved portions of the S-shaped slits at their point of greatest separation. In this manner, the locking tab may be thrust through the incision and engaged behind the underlying panel with the hinged flap defined by the opposed arcuate portions of the S-shaped slits and the transverse slit resiliently bearing against its top or outer surface of the tab and the hinged flap defined by the reversely curved portions and transverse slit resiliently bearing against its inner or bottom surface. The tapered side edges of the tab butt against the arcuate sides of the opposed S-shaped slits to limit movement transversely and are retained from movement in the major direction of the slits by width of the free end of the tab which is greater than the width between the slits at their point of closest proximity and also greater than the width between the reversely curved portions.

Turning now in detail to the attached drawings, FIGURE 6 illustrates a blank embodying the present invention generally designated by the numeral 1 which is folded into the container of FIGURES 1 through 5. The blank 1 is integrally formed of synthetic plastic sheeting which will take and hold a fold and which is relatively rigid while providing resiliency to resist the normal stresses and impacts to which the container may be subjected during usage. The blank is incised along its edges at the lines of intended fold to define top and bottom end panels, but the surfaces of the blank are smooth and unscored or otherwise unbroken.

More particularly, as best seen in FIGURE 7 wherein the dotted lines indicate the intended lines of fold, the body portion of the blank provides sequentially a rear wall panel 2, side wall panel 6, front wall panel 8, side wall panel 10 and the side flap 12 which, in the illustrated embodiment, has a pair of locking tabs 14 on its outer ege which engage in the pair of spaced incisions 4 in the rear wall panel 2 adjacent the free end thereof. The cuts in the blank provide a pair of dust flaps 16 along the bottom edge of the rear and front wall panels 2, 8, a locking flap 28 on the side wall panel 10, and a bottom end wall flap 18 upon the side panel 6. The bottom end wall flap 18 has a pair of arcuate incisions 20 adjacent to the inner end thereof in which engage the projecting noses 22 on the sides of the dust flaps 16 which overlie the bottom end wall flap 18. As best seen in FIGURES 4 and 6, the sides of the dust flaps 16 taper inwardly towards the noses 22 to facilitate passage of the noses 22 into the arcuate incisions 20 during folding as shown in FIGURE 4 and as will be pointed out more in detail hereinafter. Adjacent its free end, the bottom end wall flap 18 is provided with a locking incision 24 in which engages the locking tab 26 of the locking flap 28. Thus, as shown in FIGURE 2, the bottom end wall flap 18 and the dust flaps 16 interengage and are locked in position by the overlying locking flap 28 to provide a substantially rigid and high-strength closure for the bottom end of the container.

At the opposite or top edge of the body portion in the erected position, cuts in the blank provide dust flaps 30 on the side wall panels 6, 10 and an elongated flap generally designated by the numeral 32 on the rear wall panel 2. The flap 32 is folded as indicated by the dotted line in FIGURE 7 to provide a top end wall panel portion 34 overlying the dust flaps 30 and a tuck flap portion 36 extending normally thereto along the inner surface of the front wall panel 8, thus enabling facile opening and closing of the container. Due to the inherent resiliency of the plastic sheet, the tuck flap portion 36 is biased against the surface of the front wall panel 8, thus enabling facile opening and closing of the container. Due to the inherent resiliency of the plastic sheet, the tuck flap portion 36 is biased against the surface of the front wall panel 8 to provide a relatively secure closure.

Turning now in detail to the interlock of the present invention which is best shown in FIGURE 3 with respect to the lock for the side wall panels and FIGURES 14 through 16 with respect to the lock for the bottom end wall panel, the underlying panel is provided with a complex curvilinear incision including an S-shaped slit 38 and an inverted S-shaped slit 40 spaced therefrom disposed so that the slits have opposed arcuate portions pointing towards each other at the ends spaced away from the free end of the panel and reversely curved portions with terminal portions extending towards each other at the ends adjacent the free end of the panel. A transverse arcuate slit 42 pointing towards the free end of the panel intersects the S-shaped slit 38, 40 at the opposed arcuate portions but spaced towards the free end of the panel from their point of closest proximity. In this manner, a pair of hinged flaps 44, 46 are provided between the S-shaped slits 38, 40.

The overlying panel or flap (numeral 12 in FIGURE 3; numeral 28 in FIGURES 14–16) has a locking tab (numeral 44 in FIGURE 3; numeral 26 in FIGURES 14–16) extending therefrom which is generally of dovetailed configuration with its free end being of greater width than its root portion and also of greater width than the spacing between the S-shaped slits 38, 40 at the point of closest proximity between the opposed arcuate portions and the point of greatest separation between the reversely curved portions. The sides of the locking tab taper inwardly to the root portion which is of greater width than the spacing between the opposed arcuate portions of the slits at their point of closest proximity but of lesser width than the spacing between the reversely curved arcuate portions adjacent the free end of the panel at their point of greatest separation.

Because of the inherent resiliency of the synthetic plastic sheet material, the locking tab can be bent and thrust through the slits 38, 40 adjacent the free end of the panel so that it overlies the flap 44 which resiliently bears against its inner surface and it in turn is overlain by the flap 46 which resiliently bears upon its outer surface. Since the locking tab, including its root portion, is of greater width than the spacing between the opposed arcuate portions of the slits 38, 40 at their point of closest proximity, movement of the tab in the direction away from the free end of the underlying panel is limited by the abutment of its side edges against the edges of the opposed arcuate portions of the slits which decrease in distance of separation to their point of closest proximity. Movement of the tab towards the free end of the panel is limited by the bottoming of the tab in the reversely curved arcuate portions since the free end of the tab is of greater width than the distance between the reversely curved portions at their point of greatest separation. By proper dimensioning of the tab and incision, the tab 14 can be seated within the incision so that the side edges of its root portions are in close proximity to the reversely curved arcuate portions adjacent the free end of the panel to minimize even further the little lateral movement which is permitted before the side edges of the tab abut against the sides of the slits. Since the overlying panels are clamped together by the inherent resiliency of the flaps 44, 46, there is substantially no tendency for external bowing and thus substantially parallel external surfaces are provided.

The method of folding the blank into the container is diagrammatically illustrated in FIGURES 8 through 17. The first step is illustrated in FIGURE 8 wherein the blank 1 is supported upon a die pad 48 of resiliently deformable material, such as rubber, along the intersection of the bottom flaps with the body panels. A rigid folding blade 50 presses the blank into the rubber-like material of the die pad 48 and causes the rubber-like material to flow and press the blank about the edge of the folding blade 50. As pointed out in the aforementioned Palmer United States Patent No. 2,954,725, the blade 50 is preferably at an acute angle with respect to the surface of the blank 1 so that the flaps will be folded about the edge of the blade to an angle greater than 90 degrees, thus overfolding the plastic material to compensate for any inherent relax characteristics therein and provide a permanent bend or fold therein.

As seen in FIGURES 9 and 10, the blank 1 is then supported upon a series of pivotally mounted rocker support members 54, 56, 58 and 60, and the blank 1 is located thereon with the intended lines of fold in the body portion in substantial alignment with the axes of pivotal movement. An end support 62 and intermediate supports 64 between the several support members are preferably provided. The several rocker supports 54–60, the end support 62 and the intermediate supports 64 are each provivded with a pad 66 of resiliently deformable or rubber-like material upon which the blank 1 is disposed to provide four spaced and independently pivotable die pad elements.

A folding mandrel 68 is carried by the support arm 70 which extends therefrom beyond the upper end flaps for rolling movement laterally over the blank and supports. The mandrel 68 is of generally rectangular configuration with its sides dimensioned so that the side edges will align with the intended lines of fold in the body of the blank and the axes of the rocker support members during rotation of the mandrel. As best seen in FIGURE 9, the sides of the mandrel 68 are provided with undercut portions 72 adjacent the edges to provide knife-like edges 74.

As best seen in FIGURE 9, the rocker supports 54, 56, 58, and 60 are preferably biased in the at-rest position to a position wherein the upper surface is slightly inclined towards the folding mandrel 68 to ensure firm engagement with the mandrel 68 as it rolls thereonto and to limit or prevent slippage of the blank therebetween. An angle of about 8 to 18 degrees has proven satisfactory. By the pivotal mounting of the rocker supports, the supports roll with the rotating mandrel to maintain the blank in contact with the surface thereof. This pivotal support has been found to accommodate variations in the relative speed of rotation and speed of lateral movement of the mandrel.

In FIGURE 10, the mandrel 68 has rolled and pressed the plastic sheet material of the blank 1 into the pad 66 of deformable material on the rocker support member 54 and the resiliently deformable material then flows to press the plastic sheet material about the knife edge 74 into the undercut recesses 72 to overfold the plastic sheet material and provide a permanent fold. As the mandrel 68 is making the fold, the resilient material of the pad 66 holds the rear panel 2 against the side of the mandrel 68, and a finger 76 presses against the dust flap 16 and thereby the bottom end wall flap 18 to guide the nose portion 22 of the dust flap 16 into the arcuate incision 20. As the mandrel 68 continues to roll, the rocker support member 54 pivots in the direction of its rotation to prevent slippage of the blank relative to the mandrel.

In FIGURE 11, the second fold is being made on the rocker support 56 and a finger 78 simultaneously presses against the other dust flap 16 to guide the nose 22 into the arcuate incision 20. In FIGURE 12, the third fold is being made upon the rocker support member 58. As the mandrel 68 continues to roll and the side wall panel portion of the blank rests against the bottom of the mandrel 68, the intermediate support 64 between the rocker support members 58, 60, a finger 82 presses against the locking tab 26 to thrust it inwardly of the locking incision 24 as shown in FIGURES 14 through 16.

As the mandrel 68 rolls over the last rocker support member 60, the last fold of the body defining the side flap 12 is made to provide a tubular body element and, as the mandrel 68 continues to roll, the side flap 12 moves into position closely overlying the rear panel 2 for engagement therewith. In the illustrated embodiment, the fingers 80 thrust the locking tabs 14 inwardly of the incisions 4 to lock the body panels in assembly and provide a container body ready to receive the merchandise to be placed therein.

Figure 17:
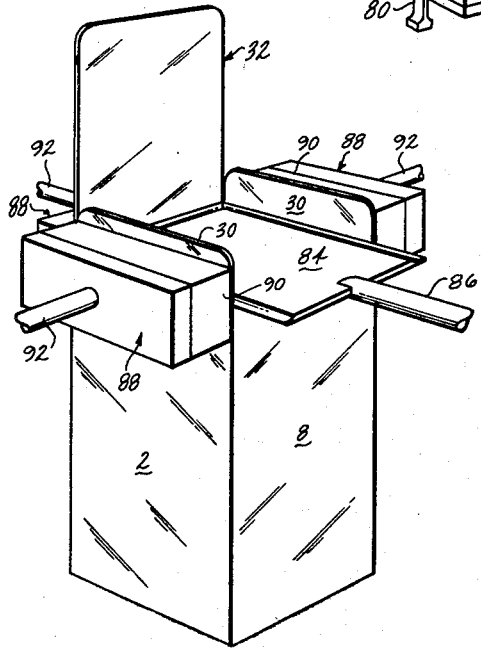
FIGURE 17 is a fragmentary perspective view diagrammatically illustrating the folding of the top end flaps.

As shown in FIGURE 17, after the container has been filled, a folding blade 84 carried by the support arm 86 is inserted over the top edge of the front panel 8 into the top of the container with its edges aligned with the lines of intended fold in the dust flaps 30 and elongated flap 32.

As shown, the upper edge of the front panel 8 is spaced below the intended lines of fold and the cuts defining the several flaps so as to compensate for the thickness of the folding blade 84 which extends thereover. Die supports 88 are carried by support arms 92 and spaced about the side panel 20, the rear panel 2, and side panel 6 for movement relative thereto and have pads 90 of resiliently deformable material on their faces adjacent the container. When the supports 88 are pressed against the container, the rubber-like material flows and forms the plastic sheet material about the edges of the folding blade 84 to make the folds therein defining the top flaps.

Either before or after making the above folds, the fold defining the tuck flap 36 can be similarly made by use of a separate folding blade and die pad of resilient material (not shown).

As can be seen, the folding operations are readily adapted to automatic packaging machinery and can be conducted at rapid speeds on the production lines. In place of the simple tuck flap closure for the upper end wall, a mechanical interlock can also be utilized. In place of the locking tab and incision interlock for the side flap and underlying wall panel, adhesive solvent sealing or heat sealing may also be employed or external means may ensure the desired closely overlying position thereof in the assembled container.

The synthetic plastic sheet material should be semi-rigid with sufficient flexibility to accommodate stresses and impacts occurring during normal usage. The material should also have the characteristics of being foldable and retaining a fold in accordance with the aforementioned Palmer patent. From the standpoint of optimum aesthetic qualities and visibility, the plastic sheeting should be clear and relatively resistant to scratching during normal usage. Although a number of plastic materials may be satisfactorily employed, biaxially oriented polystyrene of about 5 to 15 mils thickness has been advantageously employed because of its clarity, high strength and semi-rigidity coupled with sufficient resiliency and flexibility to provide durable folds and resistance to normal impacts.

As can be readily appreciated, the container of the present invention is highly attractive and relatively rigid in assembly to provide a high-strength package. The mechanical interlock of the present invention is of high strength and limits relative displacement of overlying panels even to the point of causing damage to the panels to effect disengagement. The blank and method enable the erection of the container speedily and in simple sequences adapted to automatic packaging equipment in high-speed production lines.

Having thus described the invention, we claim:

1. In the method of forming a container of synthetic plastic sheet material, the steps comprising forming an unscored container blank of semi-rigid synthetic plastic sheet material and including a body portion adapted to be cold folded into four wall panels defining a container body of rectangular configuration and a side-locking flap along one outer side thereof, said blank having a locking tab on said one outer side and a cooperating locking incision adjacent the other outer side thereof for interengagement upon folding of the blank into the rectangular body configuration, said blank being incised along one edge at the lines of intended fold for the wall panels of the body to provide a bottom end wall flap, a pair of dust flaps and an end-locking flap and adapted to provide a closure for one end of the container, said end-locking flap and end-wall flap being spaced apart by a dust flap and one of said locking flap and end-wall flap extending from the portion of the blank adjacent said locking flap of the body portion, one of said locking flap and end wall flap having a locking incision therein and the other of said locking flap and end wall flap having a locking tab thereon engageable in said incision to provide a firm closure, said blank being incised along the other edge thereof at the lines of intended fold for the said wall panels to provide flaps adapted to be folded into a closure for the other end of said body; supporting the said blank between a die pad of resiliently deformable material and a rigid folding blade with the die pad providing resilient support for said blank along the intended fold line for the flaps along said one edge and defined by the inner end of the incisions therein forming the flaps; causing said blade to press said blank into said die pad along said line of intended fold to cause said deformable material to flow and fold the blank about the blade to establish a permanent fold in said blank defining the flaps on said edge; supporting said folded blank on a die pad of resiliently deformable material along the intended lines of fold defining the several wall panels of the body; and rolling a folding mandrel of generally rectangular cross section over said blank to cause the side edges thereof to press said blank into the deformable material along the intended lines of fold and cause the deformable material to flow and fold the blank about the side edges of the mandrel to establish permanent folds in the blank and form a rectangular body portion conforming generally to the periphery of said mandrel with a side flap overlying the adjacent wall panel formed by the other outer side of the blank, said locking tab of the side flap being thrust into said locking incision of the panel formed by the said other outer side during the rotation of the mandrel.

2. The method in accordance with claim 1 wherein said plastic sheet material of the blank is of biaxially oriented polystyrene of 5 to 15 mils thickness.

3. The method in accordance with claim 1 wherein said locking incisions of the blank are comprised of a pair of opposed generally S-shaped slits and an arcuate slit extending transversely thereof and intersecting said S-shaped slits, said S-shaped slits having opposed arcuate portions at the ends spaced away from the edge of the blank and reversely curved portions with their termini extending towards each other at the ends adjacent the edge of the blank, said transverse arcuate slit intersecting said opposed arcuate portions at a point spaced towards the edge of the blank from their point of closest proximity and providing a pair of hinged flaps between said S-shaped slits and wherein each of said locking tabs is of generally dovetailed configuration with its free end being of greater width than the spacing between said S-shaped slits, said tabs tapering inwardly to a reduced width at the root portion which is of greater width than the spacing between the opposed arcuate portions at their point of closest proximity but of lesser width than the spacing between the reversely curved arcuate portions of their point of greatest separation, said tabs being adapted to extend inwardly of said incisions at a point spaced towards the edge of the underlying panel from the point of closest proximity between said opposed arcuate portions with the sides of its free end portions being disposed along the inner surface of the underlying panels outwardly of said incisions at said opposed arcuate portions whereby said tabs will overlie the hinged flaps adjacent the edges of the underlying panels and the others of said hinged flaps will overlie said tabs and said hinged flaps will resiliently bear against the surfaces of said tabs to provide firm engagement.

4. In the method forming a container of synthetic plastic sheet material, the steps comprising forming an unscored container blank of semi-rigid synthetic plastic sheet material and including a body portion adapted to be cold-folded into four wall panels defining a container body of rectangular configuration and a body-locking flap along one outer side thereof adapted to overlie the wall panel provided by the other outer side thereof, said blank having a pair of spaced locking tabs on said one outer side thereof and a pair of cooperating locking incisions adjacent the other outer side thereof for interengagement upon folding of the blank into the rectangular body configuration with the body-locking flap overlying the wall panel provided by the other outer side of the blank, said blank being incised along one edge at the lines of intended fold for the wall panels of the body to provide an end wall flap, a pair of dust flaps and an end-locking flap extending from one edge of the wall panel portions and adapted to be folded to extend normally to said wall panel portions and interengage to provide a closure for one end of the container, said end-locking flap and end wall flap being spaced apart by a dust flap and said locking flap extending from the wall panel portion of the blank adjacent said body-locking flap, said end wall flap having a locking incision therein adjacent the free end thereof and said locking flap having a locking tab thereon engageable in said locking incision to provide a firm closure for one end of the container, said blank being incised along the other edge thereof at lines intended fold for the said wall panels to provide flaps adapted to be folded into a closure for the other end of the container, said locking incisions being each comprised of a pair of opposed generally S-shaped slits and a slit extending transversely thereof and intersecting said S-shaped slits, said S-shaped slits having opposed arcuate portions at the ends spaced away from the edge of the blank and reversely curved portions with their termini extending towards each other at the ends adjacent the edge of the blank, said transverse slit intersecting said opposed arcuate portions at a point spaced towards the edge of the blank from their point of closest proximity and providing a pair of hinged flaps between said S-shaped slits, said locking tabs each being of generally dovetailed configuration with its free end being of greater width than the spacing between said S-shaped slits and tapering inwardly to a reduced width at its root portion which is greater in width than the spacing between the opposed arcuate portions at their point of closest proximity but of lesser width than the spacing between the reversely curved arcuate portions at their point of greatest separation, said tabs being adapted to extend inwardly of said incision at a point spaced towards the edge of the underlying panel from the point of closest proximity between said opposed arcuate portions with the sides of its free end portion being disposed along the inner surface of the underlying panel outwardly of said incision at said opposed arcuate portions whereby said tabs will overlie the hinged flap adjacent the outer edge of the underlying panel and the other of said hinged flaps will overlie said tab and said hinged flaps will resiliently bear against the surfaces of said tab to provide firm engagement; supporting the said blank between a die pad of resiliently deformable material and a rigid folding blade with the die pad providing resilient support for said blank along the intended fold line for the flaps along said one edge and defined by the inner end of the incisions forming the flaps; causing said blade to press said blank into said die pad along said line of intended fold to cause said deformable material to flow and fold the blank about the blade to establish a permanent fold in said blank defining the flaps on said one edge; supporting said folded blank on die pads of resiliently deformable material along the intended lines of fold defining the wall panels of the body; and rolling a folding mandrel of generally rectangular cross section over said blank to cause the side edges thereof to press said blank into the deformable material of the die pads along the intended lines of fold and cause the deformable material to flow and fold the blank about the side edges of the mandrel to establish permanent folds in the blank and form a rectangular body portion conforming generally to the periphery of said mandrel with a body-locking flap overlying the adjacent wall panel formed by the said other outer side of the blank, said locking tabs of the body-locking flap being thrust into said locking incisions of the panel formed by the said other outer side of the blank during the rotation of the mandrel thereover and said flaps of said one edge being formed into superposed relationship with the end-locking flap being disposed outwardly of said end wall flap and dust flaps and the locking tab therein being thrust into the locking incision in said end wall flap during rotation of the mandrel thereover.

5. The method of claim 4 wherein said die pads supporting the folded blank along the intended lines of fold defining the wall panels of the body pivot about an axis in substantial alignment with the intended lines of fold during the rotation of the mandrel thereover.

6. In the method of forming a container of synthetic plastic sheet material, the steps comprising forming an unscored container blank of semi-rigid synthetic plastic sheet material and including a body portion adapted to be cold-folded into four wall panels defining a container body of rectangular configuration and a body-locking flap along one outer side thereof adapted to overlie the wall panel provided by the other outer side thereof, said blank having a pair of spaced locking tabs on said one outer side thereof and a pair of cooperating locking incisions adjacent the other outer side thereof for interengagement upon folding of the blank into the rectangular body configuration with the body-locking flap overlying the wall panel provided by the other outer side of the blank, said blank being incised along one edge at the lines of intended fold for the wall panels of the body to provide an end wall flap, a pair of dust flaps and an end-locking flap extending from one edge of the wall panel portions and adapted to be folded to extend normally to said wall panel portions and interengage to provide a closure for one end of the container, said end-locking flap and end wall flap being spaced apart by a dust flap and said locking flap extending from the wall panel portion of the blank adjacent said body-locking flap, said end wall flap having a locking incision therein adjacent the free end thereof and said locking flap having a locking tab thereon engageable in said locking incision to provide a firm closure for one end of the container, each of said dust flaps having a nose projecting from the free end thereof at the sides adjacent the bottom end wall flap and said bottom end wall flap having a pair of spaced arcuate slits adjacent the inner end thereof into which said noses of the dust flaps are adapted to extend upon folding of the blank, said blank being incised along the other edge thereof at lines of intended fold for the said wall panels to provide flaps adapted to be folded into a closure for the other end of the container, said locking incisions being each comprised of a pair of opposed generally S-shaped slits and a slit extending transversely thereof and intersecting said S-shaped slits, said S-shaped slits having opposed arcuate portions at the ends spaced away from the edge of the blank and reversely curved portions with their termini extending towards each other at the ends adjacent the edge of the blank, said transverse slit intersecting said opposed arcuate portions at a point spaced towards the edge of the blank from their point of closest proximity and providing a pair of hinged flaps between said S-shaped slits, said locking tabs each being of generally dovetailed configuration with its free end being of greater width than the spacing between said S-shaped slits and tapering inwardly to a reduced width at its root portion which is greater in width than the spacing between the opposed arcuate portions at their point of closest proximity but of lesser width than the spacing between the reversely curved arcuate portions at their point of greatest separation, said tabs being adapted to extend inwardly of said incision at a point spaced towards the edge of the underlying panel from the point of closest proximity between said opposed arcuate portions with the sides of its free end portion being disposed along the inner surface of the underlying panel outwardly of said incision at said opposed arcuate portions whereby said tabs will overlie the hinged flap adjacent the outer edge of the underlying panel and the other of said hinged flaps will resiliently bear against the surfaces of said tab to provide firm engagement; supporting the said blank between a die pad of resiliently deformable material and a rigid folding blade with the die pad providing resilient support for said blank along the intended fold line for the flaps along said one edge and defined by the inner end of the incisions forming the flaps; causing said blade to press said blank into said die pad along said line of intended fold to cause said deformable material to flow and fold the blank about the blade to establish a permanent fold in said blank defining the flaps on said one edge; supporting said folded blank on die pads of resiliently deformable material along the intended lines of fold defining the wall panels of the body; and rolling a folding mandrel of generally rectangular cross section over said blank to cause the side edges thereof to press said blank into the deformable material of the die pads along the intended lines of fold and cause the deformable material to flow and fold the blank about the side edges of the mandrel to establish permanent folds in the blank and form a rectangular body portion conforming to the periphery of said mandrel with a body-locking flap overlying the adjacent wall panel formed by the said other outer side of the blank, said locking tabs of the body-locking flap being thrust into said locking incisions of the panel formed by the said other outer side of the blank during the rotation of the mandrel over said blank, said folded dust flaps of said one edge being directed outwardly of the said end wall flap and having their noses inserted into the arcuate slits in said end wall panel during rotation of the mandrel over said blank, and said end locking flap on said one edge being directed outwardly of said dust flaps and having its locking tab thrust into said locking incision during rotation of the mandrel over said blank.

7. In the method of forming a container of synthetic plastic sheet material, the steps comprising supporting a blank of synthetic plastic sheet material between a die pad of resiliently deformable material and a folding mandrel of generally rectangular cross section and having undercut portions in its side surfaces adjacent the side edges; and rolling said mandrel over said blank to press said blank into the resiliently deformable material and cause the deformable material to flow and fold the blank about the side edges of the mandrel to establish permanent folds in the blank and form a rectangular body portion conforming generally to the periphery of said mandrel with a flap on one side of the blank overlying the wall panel formed by the other side of the blank.

8. The method in accordance with claim 7 wherein said blank is supported upon a die pad composed of four separate die pad elements each mounted for independant pivotal movement about an axis substantially coinciding with a side edge of the mandrel during rotation thereof over said blank and wherein said die pads pivot with said mandrel as it rotates thereover.

9. The method in accordance with claim 7 wherein said synthetic plastic sheet material is biaxially oriented polystyrene of about 5–15 mils in thickness.

10. In the method of forming a container of synthetic plastic sheet material, the steps comprising forming an unscored container blank of semi-rigid synthetic plastic sheet material and including a body portion adapted to be cold folded into four wall panels defining a container body of rectangular configuration and a side flap along one outer side thereof, said blank being incised along one edge at the lines of intended fold for the body to provide a bottom end wall flap, a pair of dust flaps and an end-locking flap and adapted to provide a closure for one end of the container, said end-locking flap and end-wall flap being spaced apart by a dust flap and one of said locking flap and end-wall flap extending from the portion of the blank adjacent said locking flap of the body portion, said locking flap and end-wall flaps being adapted to be engaged to provide a firm closure, said blank being incised along the other edge thereof at the lines of intended fold for the said wall panels to provide flaps adapted to be folded into a closure for the other end of said body; supporting the said blank between a die pad or resiliently deformable material and a rigid folding blade with the die pad providing resilient support for said blank along the intended fold line for the flaps along said one edge and defined by the inner end of the incisions therein forming the flaps; causing said blade to press said blank into said die pad along said line of intended fold to cause said deformable material to flow and fold the blank about the blade to establish a permanent fold in said blank defining the flaps on said edge; supporting said folded blank on a die pad of resiliently deformable material along the intended lines of fold defining the several wall panels of the body; and rolling a folding mandrel of generally rectangular cross section over said blank to cause the side edges thereof to press said blank into the deformable material along the intended lines of fold and cause the deformable material to flow and fold the blank about the side edges of the mandrel to establish permanent folds in the blank and form a rectangular body portion conforming generally to the periphery of said mandrel with a side flap extending along the surface of the adjacent wall panel formed by the other outer side of the blank.

11. The method in accordance with claim 10 wherein one of said locking flap and said end wall flap has a locking incision therein and the other thereof has a locking tab thereon engageable in said incision to provide a firm closure, and wherein said locking tab is inserted into said locking incison durng the folding of the rectangular body portion by said mandrel.

No references cited.

FRANK E. BAILEY, *Primary Examiner.*